Feb. 13, 1962  O. S. MARITANO  3,020,589
DEVICE FOR MOLDING ARTICLES BY COMPACTING POWDER MATERIAL
Filed July 28, 1960  2 Sheets-Sheet 1
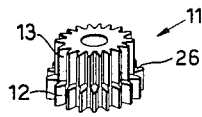
Fig. 1
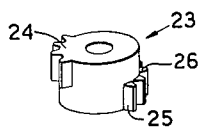
Fig. 5
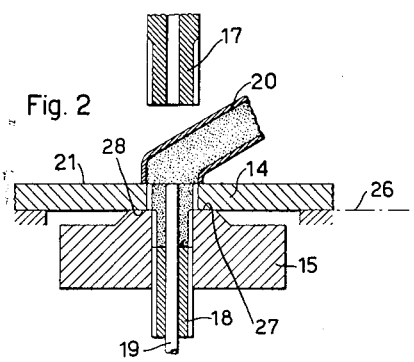
Fig. 2
Fig. 3
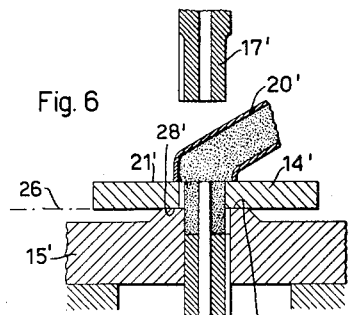
Fig. 6
Fig. 7
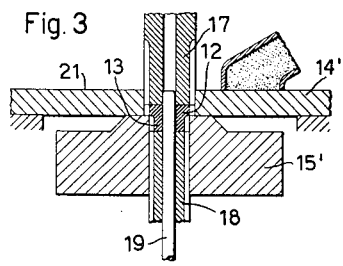
Fig. 4
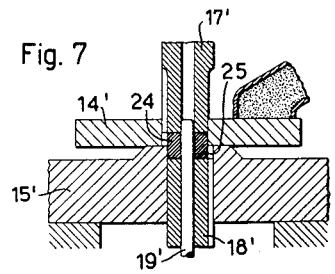
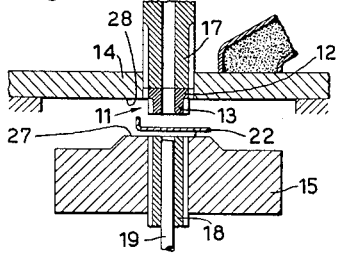
Fig. 8

Feb. 13, 1962 O. S. MARITANO 3,020,589
DEVICE FOR MOLDING ARTICLES BY COMPACTING POWDER MATERIAL
Filed July 28, 1960 2 Sheets-Sheet 2
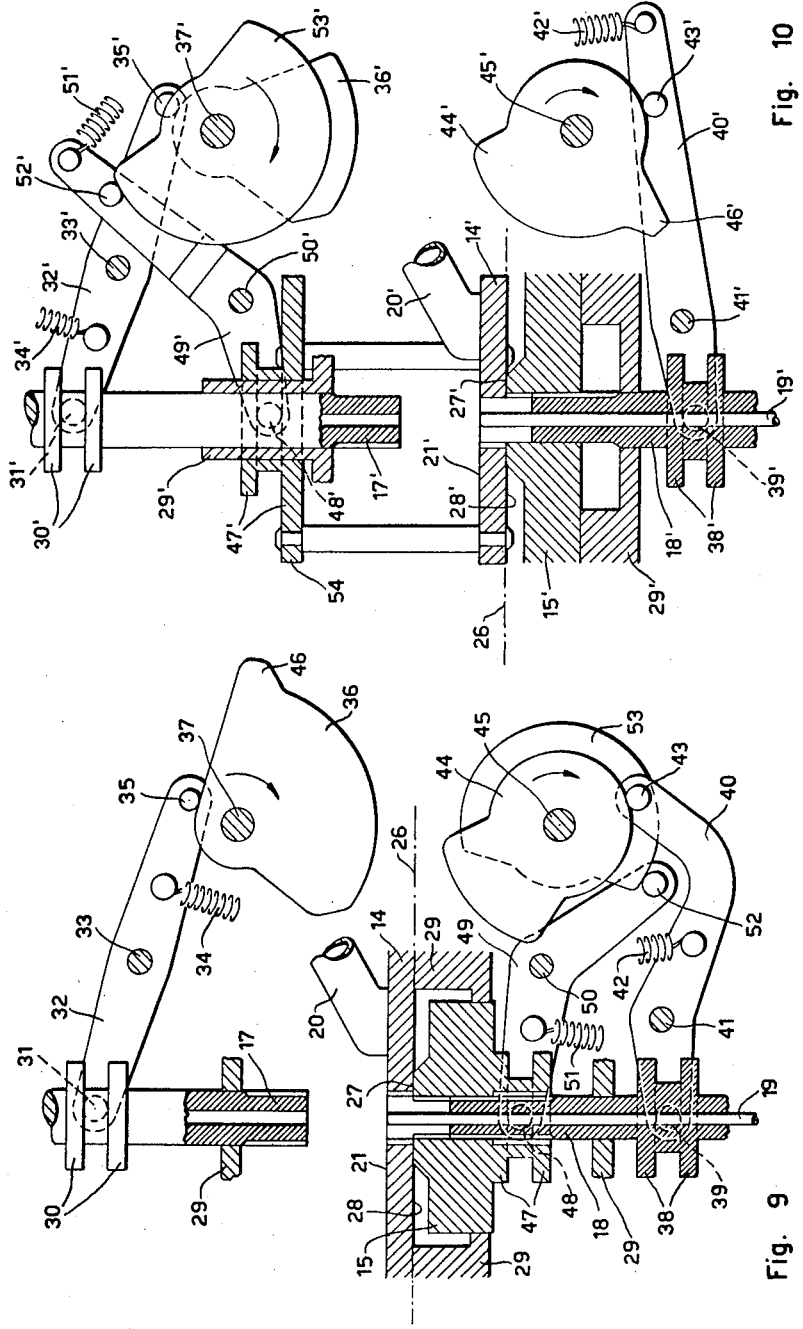

United States Patent Office 3,020,589
Patented Feb. 13, 1962

3,020,589
DEVICE FOR MOLDING ARTICLES BY COMPACTING POWDER MATERIAL
Oddino S. Maritano, Ivrea, Italy, assignor to Ing. C. Olivetti & C., S.p.A., Via Jervis, Ivrea, Italy, a corporation of Italy
Filed July 28, 1960, Ser. No. 45,923
3 Claims. (Cl. 18—16.5)

This invention relates to the presses for molding articles by compacting powder material, and more particularly it relates to a molding device for compacting iron powder to be thereupon sintered.

The need often arises to mold intricated articles substantially formed of two cylindrical or prismatic parts having different cross-sections and adjoining each other on a horizontal plane perpendicular to the direction of their longitudinal axes.

The known devices for molding articles of this kind usually comprise a single die formed according to the contour of the part having the larger cross-section, and a pair of punches arranged opposite said horizontal plane and each one having a contour corresponding to the shape of the cross-section of one of said parts, the powder material being fed into the die from the top thereof below the upper punch. For the surface portion of the part having the larger cross-section which on said plane is not covered by the part having the smaller cross-section a third punch is provided, whose outer contour corresponds to the shape of the part having the larger cross-section, and whose inner contour corresponds to the shape of the part having the smaller cross-section. By providing this third punch the double result is obtained of enabling the powder material of said uncovered portion to be compacted at a density similar to that of at which the remaining portions of the article are compacted by the pair of punches, thus ensuring a uniform density throughout the article, and of supporting said uncovered portion during the ejection of the article from the die to prevent the dead edges thereof from being damaged.

If the uncovered portion is very small, or if it is formed of a plurality of mutually disconnected elementary portions, as for example in the case of two coaxial toothed wheels having their outer diameters differing by a small amount, the third punch will be intricated and expensive or even impossible to manufacture, whereby in many cases the articles of the above kind are not manufactured through the sintering process.

Some special purpose powder compacting presses are known, in which a die assembly formed of two adjacent die portions is provided. In one press designed to mold articles of a very simple shape by means of a single punch movable into one of said die portions, the two die portions are mutually removable through a stroke at least equal to the height of the article to enable said punch to eject the molded article from between the die portions, the other die portion having a shape according to the corresponding end of the article to provide a movable bottom for the die assembly. Obviously by the use of a single punch it is not possible to ensure a uniform density throughout the article, whereby such a press is unsuitable for molding the above mentioned intricated article formed of two cylindrical or prismatic parts.

In another known press designed to mold intricated articles by means of several punches, the die assembly is formed of two adjacent die portions in order to simplify the manufacture thereof, said die portions being irremovably mounted on the press, whereby the need for a third punch is not obviated.

The primary object of the present invention is to provide an inexpensive device for molding intricated articles. A further object of the invention is to provide a device for molding intricated articles without requiring the use of a third punch, though ensuring uniform density throughout the article and accurate ejection thereof from the die.

Still another object of the invention is to provide a device for molding intricated articles which were heretofore inaccessible to conventional molding devices According to the invention, in a device for molding an article by compacting powder material, said article being formed of two substantially cylindrical or prismatic parts having different cross-sections and adjoining each other on a horizontal plane perpendicular to the direction of their longitudinal axes, I now provide a pair of punch members arranged opposite said plane and each one having a contour corresponding to the shape of the cross-section of one of said parts, a die assembly formed of a pair of adjacent die portions contacting each other on said plane and each one associated with one of said punch members, means for feeding the powder material into said die assembly from the top thereof, means for vertically moving said punch members into the associated die portions for compacting the powder material so fed, one of said die portions being vertically shiftable from the other die portion through a stroke at least equal to the height of said article, and means for relatively moving each one of said punch members and the associated die portion to eject the corresponding part of said article therefrom between said die portions.

Other objects, features and advantages of the invention will become apparent from the following detailed description of two preferred embodiments thereof, made with reference to the accompanying drawings, wherein:

FIG. 1 is a perspective view of an article to be molded with the device of the invention;

FIGS. 2, 3 and 4 each one represent a diametrical partial sectional view of a first embodiment of the molding device according to three subsequent steps of operation;

FIG. 5 is a perspective view of another article to be molded with the device of the invention;

FIGS. 6, 7 and 8 each one represent a diametrical partial sectional view of a second embodiment of the molding device according to three subsequent steps of operation;

FIG. 9 is a diametrical sectional view of the molding device according to FIGS. 2 to 4;

FIG. 10 is a diametrical sectional view of the molding device according to FIGS. 6 to 8.

With reference to FIG 1, the numeral 11 indicates an article to manufacture by compacting iron powder to be thereupon sintered. The article 11 is formed of two cylindrical or prismatic parts having different cross-sections and adjoining each other on a horizontal plane perpendicular to the direction of their longitudinal axes. More particularly, said article is formed of two coaxial toothed wheels 12 and 13 adjoining each other on the plane 26, and having a like number of teeth. The inner diameter of the teeth of the wheel 12 is equal to the outer diameter of the teeth of the wheel 13. Furthermore, the two wheels 12 and 13 are angularly offset half a step, whereby the portion of the surface of the wheel 12 which on the plane 26 is not covered by the wheel 13 is formed of a plurality of mutually disconnected elementary portions each one comprising a tooth of the wheel 12 and the part of the wheeel 12 corresponding to the gap between two adjacent teeth of the wheel 13. Where a conventional molding device would be used, the third punch thereof should be formed of as many elementary punches as are said elementary portions. It will be readily apparent that such a device would be mostly disadvantageous from any point of view.

The molding device according to the first embodiment shown in FIGS. 2 to 4 and 9 comprises a pair of punch members 17 and 18 arranged opposite the horizontal plane 26 and each one having a contour corresponding to the shape of the cross-section of one of the parts of the article 11. More particularly, the contour of the upper punch member 17 corresponds to the contour of the wheel 12 and the contour of the lower punch member 18 corresponds to the contour of the wheel 13.

The molding device further comprises a die assembly formed of a pair of adjacent die portions 14 and 15 contacting each other on the horizontal plane 26 and each one associated with one of the punch members 17 and 18. More particularly, the upper surface 27 of the lower die portion 15 normally contacts the lower surface 28 of the upper die portion 14.

The inner surface of the upper die portion 14 corresponds to the contour of the punch member 17, and the inner surface of the lower die portion 15 corresponds to the contour of the punch member 18. The punch members 17 and 18 are internally bored and a core rod 19 is slidably mounted within the punch member 18 to provide an axial bore in the molded article. A suitable shuttle 20 slidable in a known manner on the top surface 21 of the die portion 14 is provided for feeding the powder material into the die assembly from the top surface 21.

Means are provided for vertically moving the punch members 17 and 18 into the associated die portion for compacting the powder material. More particularly, the upper punch member 17 is slidably mounted in the machine frame 29 (FIG. 9) and is provided with a pair of flanges 30 engaged by a pin 31 of a lever 32 pivoted at 33. The lever 32 is urged by a spring 34 to contact with a cam-follower 35 a cam 36 secured to a cyclically rotating shaft 37. Likewise, the lower punch member 18 is slidably mounted in the machine frame 29 and is provided with a pair of flanges 38 engaged by a pin 39 of a lever 40 pivoted at 41. The lever 40 is urged by a spring 42 to contact with a cam-follower 43 a cam 44 of a shaft 45 rotating synchronously with the shaft 37.

Furthermore, one of the two die portions is vertically shiftable from the other die portion through a stroke at least equal to the height of the molded article 11. To this end the upper die portion 14 is stationarily mounted on the machine frame 29, whereas the lower die portion 15 is slidably mounted therein.

Finally, means are provided for relatively moving each one of the two punch members 17, 18 and the associated die portion to eject the corresponding part of the molded article therefrom between the die portions. More particularly, the cam 36 is provided with a projection 46 which upon engaging the cam-follower 35 is adapted to depress the upper punch member 17 downwards from its position shown in FIG. 4 to eject the wheel 12 from the upper die portion 14. Likewise, the lower die portion 15 is provided with a pair of flanges 47 engaged by a pin 48 of a lever 49 pivoted at 50 and urged by a spring 51 to contact with a cam-follower 52 a cam 53 secured to the shaft 45.

The molding device operates as follows:

At the beginning of a cycle of operation the two die portions 14 and 15 are contacting each other, the punch member 17 is in its upper position out of die portion 14, the punch member 18 is in its lower position within the die portion 15 and the core rod 19 is in its upper position.

First upon concurrently starting the two shafts 37 and 45 for one revolution, by conventional means not shown in the drawings, the shuttle 20 is moved along the top surface 21 to the position of FIG. 2 to feed the iron powder into the die assembly 14, 15 below the upper punch member 17. Thereupon the shuttle 20 is removed.

Then the two cams 36 and 44 (FIG. 9) will cause the levers 32 and 40, respectively, to move the punch members 17 and 18 towards each other, whereby each punch member will enter the corresponding die portion to compact the iron powder therein, while the core rod 19 remains at rest (FIG. 3).

The article has thus been molded and should now be ejected from the die assembly. To this end each punch member and the associated die portion are relatively moved to eject the corresponding part of the article. More particularly, first the cam 53 (FIG. 9) enables the spring 51 to rotate the lever 49 counterclockwise. The movable die portion 15 is thus moved downwards with respect to the lower punch member 18 through a stroke equal to the height of the corresponding part of the molded article 11 whereby the wheel 13 is ejected out of the surface 27, the upper surface of the punch member 18 being now flat with the surface 27. Simultaneously, the core rod 19 is lowered to leave the bore of the article 11. During the ejection of the wheel 13 its lower surface is fully supported by the lower punch member 18 without leaving dead edges.

The cam 44 now enables the spring 42 to lower the punch member 18 concurrently with the die portion 15 which is further moved downwards until completion of a stroke somewhat longer than the height of the molded article 11, while a removing means such as a shovel 22 is placed under the molded article 11 (FIG. 4).

The projection 46 (FIG. 9) of the cam 36 now causes the lever 32 to additionally move the upper punch member 17 downwards with respect to the associated die portion 14 through a stroke equal to the height of the corresponding part of the molded article 11, whereby the wheel 12 is ejected out of the surface 28 of the stationary die portion 14. During this ejection the upper surface of the wheel 12 is fully engaged by the upper punch member 17 without leaving dead edges. The article 11 is collected by the shovel 22 and is removed from the die assembly between the two die portions 14 and 15.

Finally the die portion 15 and the punch members 17 and 18 are restored by their respective cams to their initial position of FIG. 9 and the core rod 19 is restored as well to its position of FIG. 9, whereby the molding device is ready for a new cycle of operation.

It may be understood that a molding device having a die assembly formed of two die portions is less expensive than the conventional devices, because unlike the conventional third punch the movable die portion 15 replacing same is not shaped on its outer surface. Furthermore, it will be apparent that the absence of dead edges will prevent any damage from occurring to the molded article 11 during the ejection thereof.

FIG. 5 shows a second article 23 to be molded. The article 23 is formed of two coaxial toothed sectors 24 and 25 adjoining each other on the plane 26, the toothed portion of one sector being angularly off-set 180 degrees with respect to the toothed portion of the other sector. The article 23 may not be molded by using a conventional molding device having a single die because the teeth of any sector prevent the article from being ejected from the opposite end surface of the die, even if a conventional third punch member would be provided. It would be necessary to provide two additional punches each one formed of as many elementary punches as are the teeth of the corresponding sector.

In FIGS. 6 to 8 and 10 showing a second embodiment of the invention the members coresponding to those of the first embodiment shown in FIGS. 2 to 4 and 9 have been primed. This second embodiment comprises as well a pair of punch members 17' and 18' arranged opposite the horizontal plane 26 and a die assembly formed of a pair of adjacent die portions 14' and 15' contacting each other on the plane 26. However, this embodiment differs from the first embodiment in that the lower die portion 15' is now stationarily mounted on the machine frame and the upper die portion 14' is vertically removable from the lower die portion. To this end the upper die portion 14' is secured to a disk 54 movably mounted on the machine frame 29'. The feeding shuttle 20' is now slidable on the upper surface 21' of the movable die portion 14' and is suitably connected to the iron magazine powder through a flexible tube not shown in the drawings, which enables the shuttle 20' to follow the vertical movement of the upper die portion 14'.

This second embodiment is designed for molding the article 23 shown in FIG. 5 and operates as follows:

At the beginning of a cycle of operation the two die portions 14' and 15' are contacting each other, the punch member 17' is in its upper position out of die portion 14', the punch member 18' is in its lower position within the die portion 15' and the core rod 19' in its upper position.

First upon concurrently starting the two shafts 37' and 45' for one revolution, by conventional means not shown in the drawings, the shuttle 20' is moved along the top surface 21' to the position of FIG. 6 to feed the iron powder into the die assembly 14', 15' below the upper punch member 17'. Thereupon the shuttle 20' is removed.

Then the two cams 36' and 44' (FIG. 10) will cause the levers 32' and 40' respectively to move the punch members 17' and 18' towards each other, whereby each punch member will enter the corresponding die portion to compact the iron powder therein, while the core rod 19' remains at rest (FIG. 7).

The article has thus been molded and should now be ejected from the die assembly. First the cam 53' (FIG. 10) enables the spring 51' to rotate the lever 49' clockwise. The movable die portion 14' is thus moved upwards with respect to the upper punch member 17' through a stroke equal to the height of the corresponding part of the molded article 23, whereby the sector 24 is ejected out of the surface 28', the lower surface of the punch member 17' being now flat with the surface 28'. Simultaneously, the core rod 19 is lowered to leave the bore of the article 23. During the ejection of the sector 24 its upper surface is fully supported by the upper punch member 17' without leaving dead edges.

The cam 36' now enables the spring 34' to raise the punch member 17' concurrently with the die portion 14' which is further moved upwards until completion of a stroke somewhat longer than the height of the molded article 23, while a removing means such as a shuffle 22' is placed between the die portions 14' and 15' (FIG. 8).

The projection 46' (FIG. 10) of the cam 44' now causes the lever 40' to additionally move the lower punch member 18' upwards with respect to the associated die portion 15' through a stroke equal to the height of the corresponding part of the molded article 23, whereby the sector 25 is ejected out of the surface 27' of the stationary die portion 15'. During this ejection the lower surface of the sector 25 is fully engaged by the lower punch member 18' without leaving dead edges. The article 23 is removed by the shuffle 22' from the die assembly between the two die portions 14' and 15'.

Finally the die portion 14' and the punch members 17' and 18' are restored by their respective cams to their initial position of FIG. 10 and the core rod 19' is restored as well to its position of FIG. 10, whereby the molding device is ready for a new cycle of operation.

It will be understood that many changes, modifications and improvements of the described molding devices could be made without departing from the scope of the invention. For example, the individual movements described above for ejecting the compacted article may be partially overlapped. Furthermore, more than two punch members may be provided for articles being formed of more than two parts having different cross-sections, whereby the die may be divided according to the invention in two die portions in one of the planes of variation of the cross-section, whereas for another plane of variation a conventional third punch may be provided.

In the articles shown in FIGS. 1 and 5 the two parts of each article are directly joined together thus forming a step. However, an intermediate part having a continuously variable cross-section may be provided between the two cylindrical or prismatic parts. In this case the die may be divided in correspondence with one of the two planes in which the intermediate part adjoins the other two parts.

In the above embodiments the means for vertically moving the punch members and the movable die portion have been shown as being cam-operated. Of course, hydraulic or other suitable operating means may be used.

What I claim is:

1. In a device for molding an article by compacting powder material, said article being formed of two substantially cylindrical or prismatic parts having different cross-sections and adjoining each other on a horizontal plane perpendicular to the direction of their longitudinal axes, a pair of punch members arranged opposite said plane and each one having a contour corresponding to the shape of the cross-section of one of said parts, a die assembly formed of a pair of vertically superposed die portions contacting each other on said plane and each one associated with one of said punch members, means for feeding the powder material into said die assembly from the top die member thereof, means for vertically moving said punch members into the associated die portions for compacting therein the powder material so fed, means for stationarily mounting one of said die portions, the other die portion being vertically shiftable from the stationary die portion through a stroke at least equal to the height of said article, and means for relatively moving each one of said punch members and the associated die portion to eject the corresponding part of said article therefrom, said last named means comprising means for shifting said shiftable die portion with respect to the associated punch member through a stroke equal to the height of the corresponding part of said article, and means for additionally moving the other punch member with respect to the associated stationary die portion through a stroke equal to the height of the other part of said article.

2. In a device for molding an article by compacting powder material, said article being formed of two substantially cylindrical or prismatic parts having different cross-sections and adjoining each other on a horizontal plane perpendicular to the direction of their longitudinal axes, an upper and a lower punch member arranged opposite said plane and each one having a contour corresponding to the shape of the cross-section of one of said parts, a die assembly formed of an upper and lower die portion contacting each other with a horizontal contacting surface coincident with said plane and each one associated with one of said punch members, means for feeding the powder material into said die assembly from the top die member thereof, means for vertically moving said punch members into the associated die portions for compacting therein the powder material so fed, means for stationarily mounting the upper die portion, the lower die portion being vertically shiftable from the upper die portion through a stroke at least equal to the height of said article, means for shifting said lower die portion with respect to the associated lower punch member through a stroke equal to the height of the corresponding part of said article to eject same therefrom out of the contacting surface of said lower die portion, and means for additionally moving the upper punch member with respect to the upper die portion to eject the corresponding part of said article out of the contacting surface of said upper die portion.

3. In a device for molding an article by compacting powder material, said article being formed of two substantially cylindrical or prismatic parts having different cross-sections and adjoining each other on a horizontal plane perpendicular to the direction of their longitudinal axes, an upper and a lower punch member arranged opposite said plane and each one having a contour corresponding to the shape of the cross-section of one of said parts, a die assembly formed of an upper and a lower die portion contacting each other with a horizontal contacting surface coincident with said plane and each one associated with one of said punch members, means for feeding the powder material into said die assembly from the top die member thereof, means for vertically moving said punch members into the associated die portions for compacting therein the powder material so fed, means for stationarily mounting the lower die portion, the upper die portion being vertically shiftable from the lower die portion through a stroke at least equal to the height of said article, means for shifting said upper die portion with respect to the associated punch member through a stroke equal to the height of the corresponding part of said article to eject same therefrom out of the contacting surface of said upper die portion, and means for additionally moving the lower punch member with respect to the lower die portion to eject the corresponding part of said article out of the contacting surface of said lower die portion.

References Cited in the file of this patent

UNITED STATES PATENTS

| | | |
|---|---|---|
| 2,357,407 | Kurtz | Sept. 5, 1944 |
| 2,675,581 | Payne | Apr. 20, 1954 |
| 2,821,748 | Willi | Feb. 4, 1958 |